J. Mitchell.
Excavator.
Nº 18,404. Patented Oct. 13, 1857.
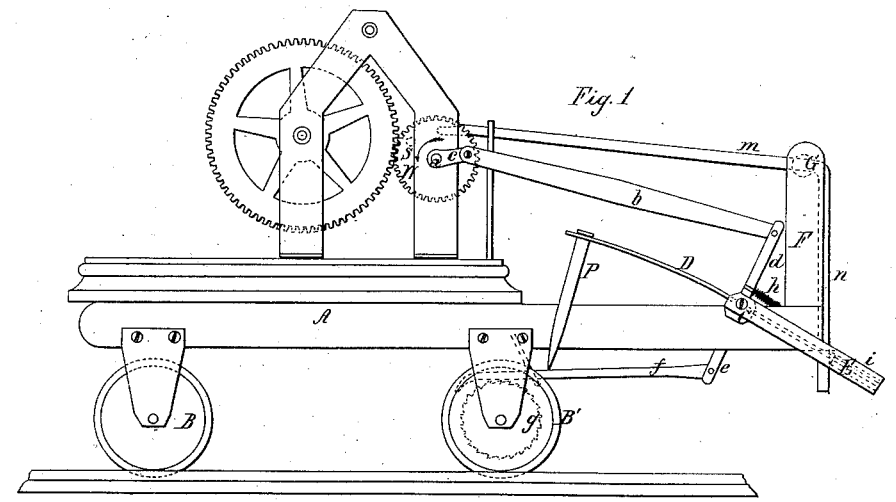
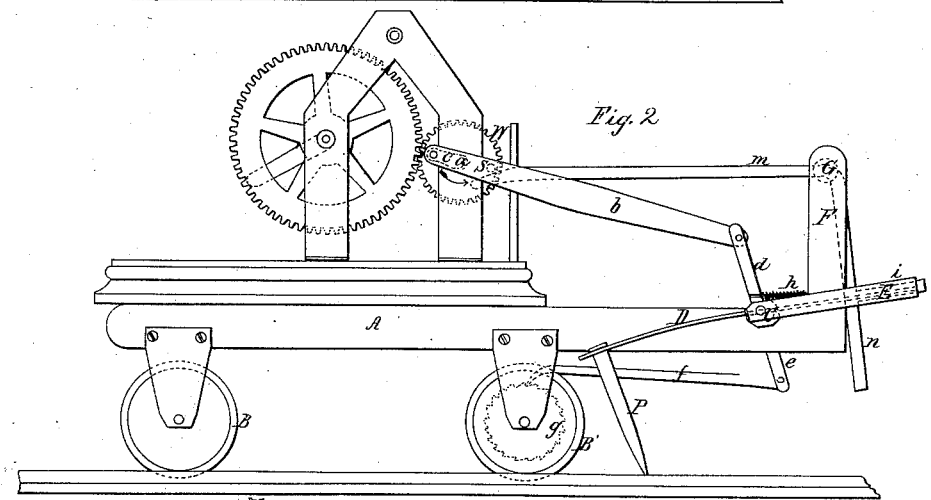
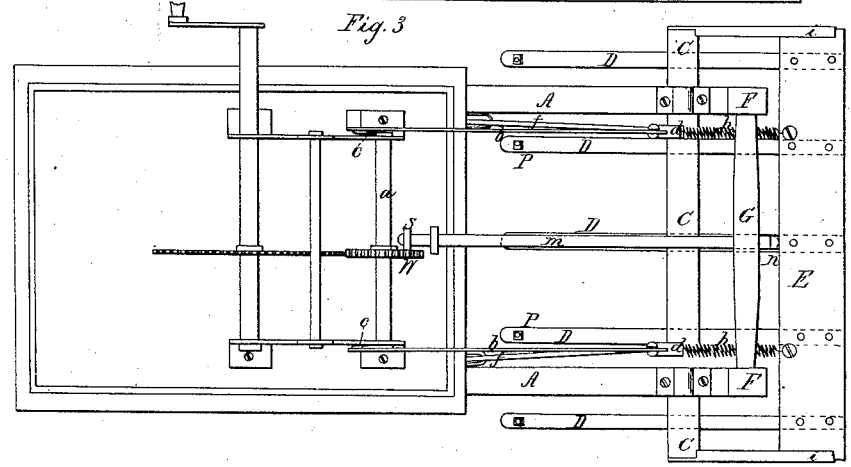

UNITED STATES PATENT OFFICE.

JAMES MITCHELL, OF OSCEOLA, IOWA.

DIGGING-MACHINE.

Specification of Letters Patent No. 18,404, dated October 13, 1857.

*To all whom it may concern:*

Be it known that I, JAMES MITCHELL, of Osceola, in the county of Clark and State of Iowa, have invented a new and useful Improvement in Digging-Machines; and I do hereby declare that the following is a full, clear, and exact description of the construction and operation of the same, reference being had to the annexed drawings, forming part of this specification, in which—

Figure 1 is a side view of the machine, showing picks elevated. Fig. 2 is a side view, with picks in digging position. Fig. 3 is a top view of the machine.

Similar characters of reference in the several figures denote the same part.

The machine here considered is designed for performing the digging necessary for making roads; and the combination of mechanism constituting my invention is made to effect the penetration of the earth and loosening of the same; and at the same time produce the necessary forward motion of the machine.

In the drawing A is the main frame of the machine, supported on car wheels B B'. Running across the machine is the driving shaft $a$, to which motion is to be given by a steam engine upon the frame.

C is a shaft having its bearings in the side pieces of the main frame. This shaft is rocked by reason of connection by rods $b$ $b$, of cranks $c$ $c$, with arms $d$ $d$ of said shaft. This shaft has also the arms $e$, to which are attached the pawls $f$ $f$, resting on ratchets $g$ $g$ on the inner faces of the rear wheels B'.

The picks P are at the extremities of the spring handles D, each running through the shaft C, and all firmly secured to the cross bar E, capable of movement in guides $i$ $i$ at the opposite extremities of shaft C. Springs $h$ $h$ connect the bar E, with arms $d$ $d$ of shaft C, so that the tendency of this bar is to approach the aforesaid shaft.

Arising from the extreme rear portion of the frame are standards F, constituting bearings of a shaft G. This shaft has two arms $m$ and $n$; the former running forward by the side of cog wheel W on shaft $a$; and the latter running downward in front of bar E. There is a stud $s$ on wheel W which when brought in contact with the top of arm $m$ turns shaft G, and causes arm $n$ to press bar E rearward. When the stud slips from arm $m$, the springs $h$ $h$ cause the bar E to move forward until the limit of its movement is reached. As the bar E is moved to the rear the handles D, are drawn through shaft C, causing the picks P to perform a drawing movement to the rear.

In operation, the machine rests upon temporary rails to facilitate its movement. The shaft $a$ is rotated in direction of arrow, producing the alternate rise and fall of the picks P. Taking the position of Fig. 1 where they are elevated, the continued movement of shaft $a$ causes them to penetrate the earth, as shown in Fig. 2. Meanwhile stud $s$ presses upon arm $m$ and throws bar E rearward, causing the picks at the time of their penetration to move to the rear and loosen the earth behind them. As the shaft C rocks toward the rear of the machine, producing the elevation of the picks, arms $e$ of this shaft move forward, and cause pawls $f$ $f$ to turn ratchets $g$ $g$ and with them wheels B' B'. This moves the machine forward a sufficient distance for the picks to penetrate unbroken ground on their next descent.

The spring handles of the picks prevent the breaking of the machinery if a rock is struck at the time of penetration.

What I claim and desire to secure by Letters Patent is—

Passing the pick handles through the rock shaft C, and attaching them to the traversing bar E, in combination with the arms $m$ and $n$ of shaft G, stud $s$, and springs $h$ actuating said bar; the arrangement and operation being substantially as set forth.

In testimony whereof, I have hereunto signed my name before two subscribing witnesses.

JAMES MITCHELL.

Witnesses:
GEO. PATTEN.
JOHN S. HOLLINGSHEAD.